United States Patent [19]

Oka

[11] Patent Number: 4,551,786
[45] Date of Patent: Nov. 5, 1985

[54] UNENCAPSULATED SOLID ELECTROLYTIC CAPACITOR AND METHOD FOR MANUFACTURING THE SAME

[75] Inventor: Hideo Oka, Tokyo, Japan

[73] Assignee: NEC Corporation, Tokyo, Japan

[21] Appl. No.: 615,821

[22] Filed: May 31, 1984

[30] Foreign Application Priority Data

May 31, 1983 [JP] Japan .............................. 58-82377[U]

[51] Int. Cl.⁴ ......................... H01G 1/14; H01G 4/32; H01R 4/02
[52] U.S. Cl. .................................. 361/306; 29/25.42; 339/275 B
[58] Field of Search ............... 361/303, 306, 307, 308; 29/25.42; 339/275 B

[56] References Cited

U.S. PATENT DOCUMENTS

| | | | |
|---|---|---|---|
| 3,098,955 | 7/1963 | Davis et al. ..................... | 361/306 X |
| 3,191,108 | 6/1965 | Boykin ........................... | 29/25.42 X |
| 3,234,442 | 2/1966 | Maissel et al. ................. | 29/25.42 X |
| 3,238,421 | 3/1966 | Patrick ........................... | 339/275 B X |
| 3,273,033 | 9/1966 | Rossmeisl ....................... | 29/25.42 X |
| 3,516,150 | 6/1970 | Leech ............................. | 29/25.42 X |
| 3,689,990 | 9/1972 | Nakata et al. .................. | 29/25.42 X |

*Primary Examiner*—Donald A. Griffin
*Attorney, Agent, or Firm*—Burns, Doane, Swecker & Mathis

[57] ABSTRACT

An unencapsulated solid electrolytic capacitor includes a substantially flat, multi-layer solid state capacitor element having an anode lead-out wire welded to a solderable flat anode terminal plate located in the same plane as that of the principal surface of the capacitor element. The terminal plate includes a pair of protrusions formed on a side of the terminal plate remote from the capacitor element. The lead-out wire has an end portion positioned between, but not extending beyond, the protrusions. A method of manufacturing the capacitor includes forming a capacitor element array by aligning respective capacitor element lead-out wires so that they are substantially parallel and are spaced at a predetermined pitch, forming notches at substantially the same locations in the lead-out wires. An anode terminal frame is constructed from a metal strip by forming a plurality of protruding regions extending from one side of the strip at the same pitch as that of the capacitor element array, and by forming in each of the protruding regions an opening defined by an end portion spaced apart from the strip and a pair of narrow branch portions extending between the end portion and the strip. The capacitor element array is then superposed on the anode terminal frame so that the notches are in registration above the openings, and the lead-out wires are welded to the respective end portions. The lead-out wires are then severed at the notches, and the narrow branch portions are cut along a line located between the severed ends of the lead-out wires and the metal strip.

9 Claims, 3 Drawing Figures

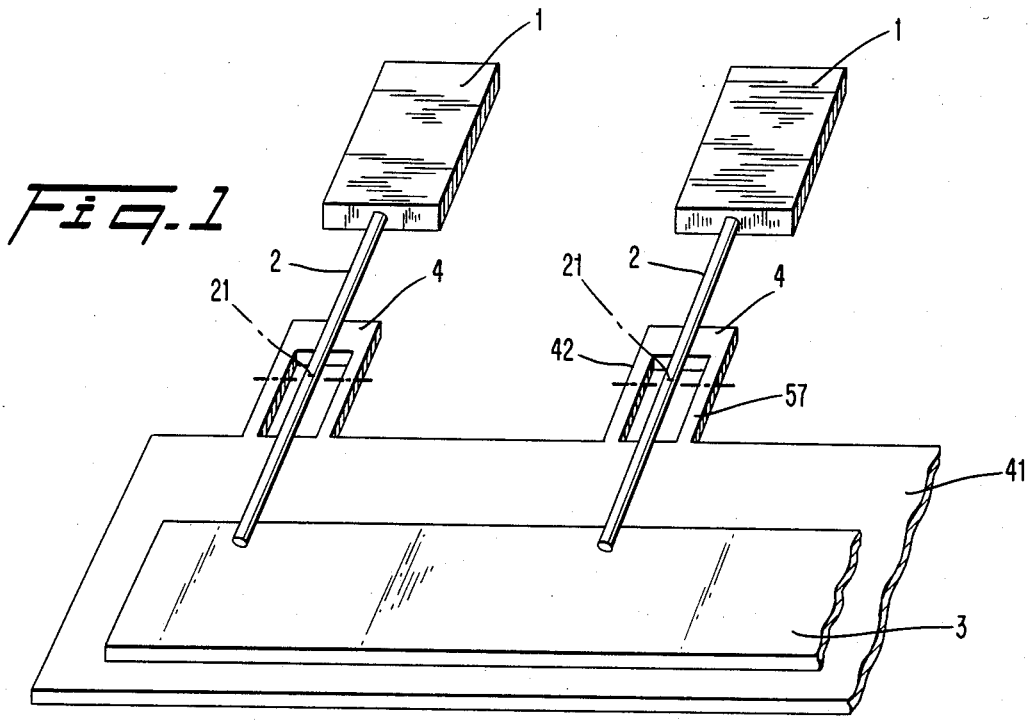
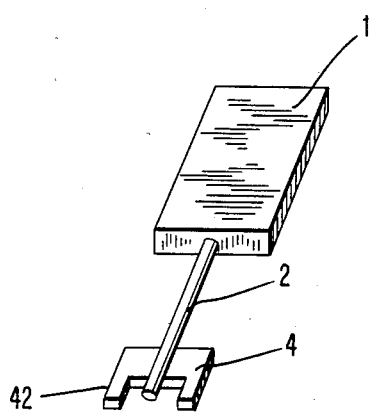
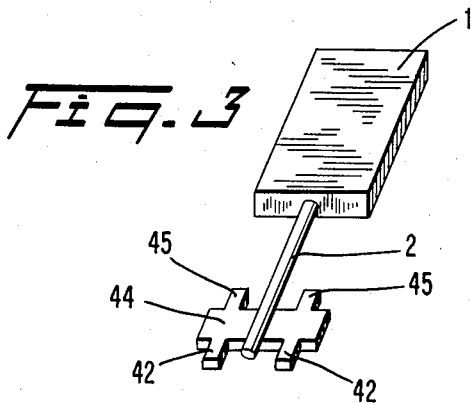

UNENCAPSULATED SOLID ELECTROLYTIC CAPACITOR AND METHOD FOR MANUFACTURING THE SAME

BACKGROUND OF THE INVENTION

The present invention relates to an unencapsulated solid-state electrolytic capacitor and a method for manufacturing the same. More particularly the present invention relates to a method of assembling a thin unencapsulated solid electrolytic capacitor by connecting a planar anode terminal to an anode lead-out wire.

In general, a solid electrolytic capacitor element of the present invention includes an anode body formed of compressed particles of a film-forming metal such as tantalum, a dielectric film layer formed on the anode body, a semiconductor layer formed on the dielectric film, and a cathode layer formed on the semiconductor layer. The capacitor element has an anode lead-out wire embedded into or welded onto the anode body. Since the lead-out wire is made of a film-forming metal such as tantalum, solderable metal should be welded to the anode lead-out wire to serve as a anode terminal. To be used as as unencapsulated solid electrolytic capacitor, or chip capacitor, the outer surface of the capacitor element is used as a cathode terminal, thereby eliminating both a cathode lead wire and the need for encapsulation. Thus high volumetric efficiency is attained. In order to meet a demand for low profile on a circuit board, both the capacitor element and the anode terminal should be made in planar shape, thereby forming thin chip capacitors. To obtain such thin chip capacitors economically, the planar anode terminal should be so connected to the anode lead-out wire as to enhance the opportunities for mass production.

SUMMARY OF THE INVENTION

It is one object of the present invention to provide a simple and inexpensive assembly method for unencapsulated solid electrolytic capacitors and an article manufactured by such assembly.

Another object of the present invention is to provide a method for manufacturing a super-thin unencapsulated tantalum solid electrolytic capacitor having a thickness smaller than 1 mm.

In the assembly method according to the present invention, a planar anode terminal frame is formd by etching or punching a solderable thin metal sheet. The configuration of this frame is such that a plurality of protruding regions are provided at predetermined intervals and projected from a metal strip, and each protruding region defines an opening therein. An end portion is spaced from the metal strip by the opening and forms a terminal portion to be welded to an anode lead-out wire of a solid electrolytic capacitor element. That is, the configuration is such that the terminal portion and the metal strip are connected via a pair of narrow branch portions within the same plane. The opening is thereby bounded by the strip, the branch portions and the terminal portion.

The lead-out wires of a capacitor element array are connected to a common support, and each lead-out wire is provided with a notch at a location where the lead-out wire is to be severed. The terminal frame and the element array are superposed in registration with each other so that the respective notches in the lead-out wires may be positioned immediately above the corresponding openings, and then the lead-out wires are welded to the terminal portions. After welding, the respective lead-out wires are severed at the notches, and thereafter the branch portions which connect the respective terminal portions to the metal strip are cut from the terminal frame.

An unencapsulated solid-state electrolytic capacitor according to the present invention includes a planar anode terminal welded to an anode lead-out wire extending outwardly and along the longitudinal axis of a flat capacitor element having a thickness smaller than 1 mm. The anode terminal has a pair of projections on its side edge remote from the capacitor element. The tip end of the lead-out wire is positioned between the pair of projections, and is further located between the tip ends of the projections and the side edge of the anode terminal.

BRIEF DESCRIPTION OF THE DRAWING

FIG. 1 is a perspective view illustrating an assembly method according to a first preferred embodiment of the present invention, FIG. 2 is a perspective view of an unencapsulated solid electrolytic capacitor manufactured by the assembly method illustrated in FIG. 1, and FIG. 3 is a perspective view of another embodiment of an unencapsulated solid electrolytic capacitor of the present invention, having an anode terminal which is different from that shown in FIG. 2.

DESCRIPTION OF PREFERRED EMBODIMENTS

As shown in FIG. 1, each solid electrolytic capacitor element 1 has a flat shape which is achieved by using a flat parallelepiped porous anode body formed by film-forming metal powder such an tantalum powder. One end of an anode lead-out wire 2 is made of film-forming metal such as tantalum and is buried in the anode body. The other ends of the respective lead-out wires 2 are welded to a common support 3 made of a metal sheet to form a capacitor element array in which the respective lead-out wires 2 are arrayed at equal intervals or pitch in the same plane. Between such other end of each lead-out wire 2 and the capacitor element 1, a notch 21 is formed in each lead-out wire 2 for the purpose of facilitating severing the wire in a subsequent step.

On the other hand, a comb-like anode terminal frame is fabricated from a solderable metal sheet such as nickel silver through the process of press-punching, etching, etc. That is, protruding regions are formed at a predetermined pitch along, and project from, a trunk strip 41. The respective protruding regions define rectangular openings bounded by trunk strip 41, a terminal portion 4 and two narrow branch portions 57. The pitch of the protruding regions is chosed to be identical to the pitch of the capacitor element array.

The common support 3 of the capacitor element array is superposed on the trunk strip 41 of the terminal frame to maintain such a positional relationship that the notches 21 in lead-out wires 2 may be positioned above the openings in the protruding regions. Under this condition, the terminal portion 4 and the lead-out wire 2 are press-welded by means of a pair of electric welding electrodes. Those portions of the lead-out wires 2 and the terminal portions 4 which overlap are welded in their entirety. To achieve a secure contact between the lead-out wires 2 and anode terminal portions 4, it is preferable to choose the width of the terminal portions 4 along the lead-out wires 2 to be larger than the thickness of the capacitor element 1. After the electrical welding step is finished, the lead-out wire 2 is severed by bending it at the location of the notch 21. Subsequently, the narrow branch portions 57, which connect the terminal portions 4 of the protruding region with the trunk strip 41, are simultaniously cut along the dotted line shown in FIG. 1, to separate the terminal portion 4 from the trunk strip 41.

This process produces an unencapsulated type of capacitor as shown in FIG. 2.

A characteristic feature of the anode terminal portion of the capacitor obtained according to the above-described embodiment is that a tip end of the lead-out wire 2, that is, the location on the lead-out wire 2 where the notch was present, is positioned inwardly of the ends of a pair of projections 42 of the anode terminal 4. In other words, the cutting position of the terminal frame is located in the terminal branch portions 57 between the notch on the lead-out wire 2 and the trunk strip 41. It is thus necessary for a cutting tool to cut such a hard material such as the tantalum lead-out wire. For this reason, and for the reason that the width of the branch portion is narrow, the cutting process can be facilitated and the life of the cutting tool can be lengthened.

While at first glance it may seem that the openings in the protruding regions of the embodiment shown in FIG. 1 need not be present, if they are omitted, they would cause the following inconveniences to occur:

First, if the openings are not present, in the step of electrically welding the lead-out wires 2 to the terminals 4, a welding current would concentrate at the locations where the notches make contact with the terminal frame. Consequently the welding strength at the locations where the welding should be effected would become insufficient. The reason why the welding current concentrates in those locations is that the surface of the tantalum wire becomes covered by an oxide coating film due to the fact that the tantalum wire has been subjected to anodic oxidation, and this oxide coating film is broken at the notched portions. It can be appreciated that the notched portions would, as a consequence, be connected to the terminal frame, thereby overshadowing the utility of notching the wires to facilitate their severing by bending.

Although it is possible to omit notching the wires, and to instead cut the lead-out wires jointly with the protruding regions of the terminal frame after welding, a tantalum lead-out wire is typically used in a tantalum capacitor, which has been widely popularized as a solid-state electrolytic capacitor. Tantalum is very hard; hence if a cutting tool is used, a cutting blade would be soon abraded to an unoperable extent. Therefore, this would be an uneconomical, impractical method.

In contrast, in the method according to the present invention, tantalum wires have been preliminarily notched, and are severed merely by bending the notched portions. Furthermore, a cutting tool need be used to cut only narrow branch portions of a terminal frame made of relatively soft metal such as nickel silver, nickel, copper, etc. Therefore, the life of a cutting tool can be maintained sufficiently long so that the method of the present invention is practical. If the width of the branch portion to be cut is chosen to be narrow, to correspond to the extent of the thickness of the terminal frame, then the life of the cutting tool can be further enhanced.

One structural feature of the unencapsulated solid electrolytic capacitor manufactured in the above-described manner according to the embodiment of the present invention shown in FIG. 1, resides in that the anode terminal 4 has a pair of projections, with the tip end of the lead-out wire 2 being positioned inside of these projections, as shown in FIG. 2. Furthermore, a principal plane of the anode terminal 4 and a principal surface in its place of the capacitor element 1 are parallel to each other. Therefore since the terminal has a planar shape, the thickness of the unencapsulated solid electrolytic capacitor would be the thickness of the portion of the capacitor element 1, so that extremely thin-chip capacitors can be manufactured using mass-production techniques. It should be understood that the distance between the anode terminal 4 and the capacitor element 1 can be arbitrarily selected.

It can be seen that the method for manufacturing unencapsulated solid electrolytic thin capacitors of the present invention is most practical, in view of welding a planar anode terminal to a lead wire led out of an extremely thin capacitor element.

Although a flat parallelepiped capacitor element was employed in the illustrated embodiment of the present invention, it can be appreciated that as long as the capacitor element is flat, the configuration of the capacitor element could be other than a parallelpiped shape, including such shapes as, for example, a circular shape or the like. Futhermore, in view of the fact that the configuration of the anode terminal need only be specified to be planar, there is no necessity to specifically define the shape of the opening. In other words, it will be also appreciated that it is only necessary to have an opening which is of sufficient configuration to separate the tip end of the lead-out wire from the anode terminal.

A second preferred embodiment illustrated in FIG. 3 differs from the embodiment shown in FIG. 2 only in the configuration of the anode terminal 44. While the second embodiment is identical to the first embodiment shown in FIG. 2 in that a pair of projections 42 are provided on the same side of the anode terminal as the tip end of the lead-out wire, in the embodiment shown in FIG. 3, another pair of projections 45 are further provided on the side of the anode terminal 44 opposite to (facing) the anode body 1. These projections 45 are shaped by punch-press, upon forming the protruding regions, so that the distance between projections 45 is somewhat smaller than the distance between the projections 42 formed by cutting the branch portions 57. These projections 45 serve as marks for registering the lead-out wires 2 in position with respect to the protruding regions. The distance between the projections 45 is perferably about 3 times as large as the diameter of the lead-out wire 2. It addition, as shown in FIG. 3, the contour of the terminal 44 need not be symmetric with respect to the lead-out wire 2.

In the embodiment shown in FIG. 2, one practical set of dimensions is as follows:

For an anode body having a width of 2.5 mm, a length of 3.0 mm and a thickness of 0.5 mm, the diameter of the lead-out wire 2 is 0.2 mm, and the anode terminal 4 has a thickness of 0.2 mm, a width of 2.0 mm and lengths in the direction of the lead-out wire 2 of 0.7 mm at the central portion and 1 mm at the opposite end portions; the width of the protrusions 42 is 0.2 mm.

Upon electric welding, since a pressing force of $1 \sim 3$ Kg/cm$^2$ is applied to the overlapping portions of the lead-out wire 2 and the anode terminal portion 4, the overlapped portion of the tantalum lead-out wire is collapsed and pressed into in the anode terminal portion 4. Therefore the terminal portion dose not protrude above the principal plane of the capacitor element. For this reason, the thickness of the unencapsulated solid electrolytic capacitor itself is determined only by the thickness of the capacitor element.

As will be apparent from the above-described preferred embodiments according to the present invention, extremely thin chip capacitors, having a thickness less than 1 mm can be easily obtained using mass-production techniques. Also the method for manufacturing such thin chip capacitors according to the present invention is particularly desirable in view of the demands for the use of such capacitors in a credit card type portable calculator.

In the foregoing, although tantalum is mentioned as film-forming metal, the invention should be understood to include other film-forming metals such as aluminum and niobium.

What is claimed is:

1. A method of manufacturing solid electrolytic capacitors, comprising the steps of:
   providing a plurality of capacitor elements having respective anode lead-out wires;
   forming a capacitor element array by connecting said anode lead-out wires of said plurality of capacitor elements to a common support such that said wires are substantially parallel to each other and are spaced at predetermined pitch;
   forming notches into said anode lead-out wires so that said notches are located at substantially the same position in respective lead-out wires;
   forming an anode terminal frame from a metal strip by forming a plurality of protruding regions extending from one side thereof at the same pitch as the pitch of the array of said lead-out wires and by forming in each of said protruding regions an opening defined by an end portion spaced apart from the strip and a pair of narrow branch portions extending between said end portions and the strip;
   superposing said capacitor element array and said anode terminal frame so that the notches formed in said respective lead-out wires are positioned in registration above said openings;
   welding said respective lead-out wires to said end portions;
   severing said respective lead-out wires at the noches after said welding step; and
   cutting and separating said narrow branch portions at positions located between the severed ends of said lead-out wires and said metal strip after said severing step.

2. The method of claim 1, wherein each of said capacitor elements comprises a porous anode body formed of tantalum powder and an anode lead-out wire formed of tantalum.

3. The method of claim 1, wherein, in the step of severing the lead-out wires, all of said lead-out wires are severed simultaneously, and wherein, in the step of cutting and separating said narrow branch portions, all of said branch portions are cut apart simultaneously by using a cutting tool.

4. The method of claim 1, wherein the width of each of said terminal portions along the direction of said lead-out wire is smaller than the thickness of said capacitor element, and further comprising the step of pressing said lead-out wire into said terminal portion.

5. An unencapsulated solid electrolytic capacitor, comprising:
   a substantially flat capacitor element having a planar principal surface and a longitudinal axis and including a flat anode body, a dielectric layer formed on the anode, a semiconductor layer formed on the dielectric layer and a cathode layer formed on the semiconductor layer;
   an anode lead-out wire connected to the anode body and extending along the longitudinal axis of said capacitor element; and
   a solderable flat anode terminal plate welded to said lead-out wire in the same plane as that of the principal surface of said capacitor element, said terminal plate having a pair of protrusions formed on a side remote from the capacitor element, and said lead-out wire having an end portion positioned between, but not extending beyond, said protrusions.

6. The unencapsulated solid electrolytic capacitor of claim 5, wherein:
   the anode plate further has a side facing the capacitor element;
   the pair of protrusions are spaced apart a predetermined distance; and
   a pair of projections are formed on said side facing said capacitor element and are spaced apart a predetermined distance less than that of said protrusions.

7. The unencapsulated solid electrolytic capacitor of claim 6, wherein the predetermined distance between said projections is approximately three times the diameter of the lead-out wire.

8. The unencapsulated solid electrolytic capacitor of claim 5, wherein:
   the anode body has a width of 2.5 mm, a length of 3.0 mm and a thickness of 0.5 mm;
   the diameter of the led-out wire is 0.2 mm; and
   the anode terminal has a central portion and opposite end portions, and further has a thickness of 0.2 mm, a width of 2.0 mm, a length in the direction of the lead-out wire of 0.7 mm at the central portion and a length of 1 mm at the opposite end portions, and wherein the anode terminal protrusions have a width of 0.2 mm.

9. The unencapsulated solid electrolytic capacitor of claim 5, wherein:
   the lead-out wire is formed of tantalum; and
   the anode terminal protrusions are formed of metal which is softer than tantalum.

* * * * *